United States Patent [19]

Isakson

[11] 4,290,342
[45] Sep. 22, 1981

[54] HYDRAULIC BOOSTER VALVE

[75] Inventor: Larry E. Isakson, Owosso, Mich.

[73] Assignee: Midland-Ross Corporation, Cleveland, Ohio

[21] Appl. No.: 103,700

[22] Filed: Dec. 14, 1979

[51] Int. Cl.³ .......................................... F15B 13/10
[52] U.S. Cl. ................................. 91/391 R; 91/434; 60/547 B
[58] Field of Search ............ 91/434, 373, 372, 391 R, 91/378; 60/547 B, 550

[56] References Cited

U.S. PATENT DOCUMENTS

| | | | |
|---|---|---|---|
| 3,093,119 | 6/1963 | Stelzer | 91/434 |
| 3,173,339 | 3/1965 | Larsen | 91/434 |
| 3,532,027 | 10/1970 | MacDuff | 91/372 |
| 3,625,113 | 12/1971 | Euler | 91/391 R |
| 3,714,869 | 2/1973 | Flory et al. | 91/434 |
| 3,979,912 | 9/1976 | Kuromitsu | 91/373 |

*Primary Examiner*—Paul E. Maslousky
*Attorney, Agent, or Firm*—Richard A. Negin

[57] ABSTRACT

The present invention is an improved hydraulic booster which allows transition from a manual braking mode to a power assist braking mode without the control called for in the manual mode immediately applied when the power assist function begins to operate. This is accomplished by opening a path through a chamber in the gain valve and a bypass passage to prevent a sudden pressure buildup in the hydraulic booster at the gain valve when the hydraulic booster is operated in a manual mode and the fluid pumping means is suddenly started.

6 Claims, 1 Drawing Figure

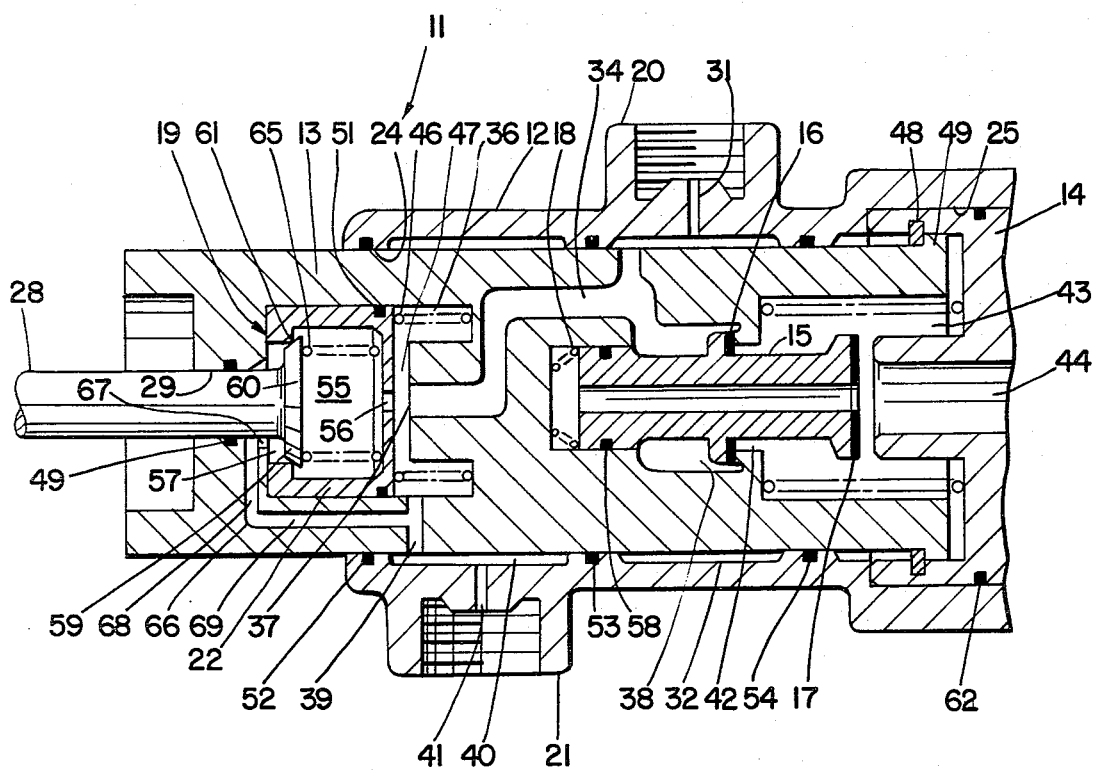

HYDRAULIC BOOSTER VALVE

BACKGROUND OF THE INVENTION

This invention is in the field of hydraulic boosters and, more particularly, relates to a valve for a hydraulic booster which maintains braking control when going from manual to power braking modes.

Hydraulic boosters are known in the art and are commonly used to assist in motor vehicle braking, i.e., power brakes. Generally, the hydraulic boosters operate in a motor vehicle using fluid from a power steering pump fed into the booster inlet. The power steering fluid pressure is increased in the booster. The increased pressure is transmitted from the booster to a braking means, such as a master cylinder.

Hydraulic boosters have a housing or casing which has an inlet in communication with the power steering pump and an outlet in communication with the power steering gear. A push rod is operatively connected to a brake pedal. When the brake pedal is depressed, the push rod causes a demand or gain valve to restrict a gap in a channel in the hydraulic booster communicating between the power steering pump and the power steering gear so as to cause an increase in pressure between the power steering pump and the restricted gap. The push rod causes a hub piston which is in a sliding relationship with the housing to move into the housing during braking. The movement of the hub piston affects a booster control valve having an inlet valve and an exhaust valve. The inlet valve opens to the higher pressure channel between the power steering pump and the restricted gap caused by the movement of the gain valve. Simultaneously, the exhaust valve closes and a power chamber between the hub and a booster piston receives the high pressure fluid. The pressure forces the booster piston, which is in slidable relationship with the housing, to move. The movement of the booster piston applies a force to a braking means, such as a master cylinder, causing the brakes to be applied. When the brakes are released, the exhaust valve opens, the inlet valve simultaneously closes, and the pressure in the power chamber decreases. Suitable means such as a return spring forces the hub and booster piston to return to a neutral or nonbraking position.

During normal operations, the hydraulic booster provides power assist to the operator of the vehicle in applying the brakes. Alternate embodiments of the basic hydraulic booster have been developed for unusual circumstances. Examples of some of these are shown in U.S. Pat. Nos. 3,093,119; 3,532,027; 3,625,113; and 3,979,912. These patents provide embodiments added to hydraulic boosters to compensate for sudden stopping, loss of braking pressure, prevention of blockage of power steering by limiting the pressure of the hydraulic booster below the maximum system pressure, and control of brake pedal travel.

An unusual circumstance occurs when the operator for some reason loses power from the power steering pump and is operating the brakes manually. During manual operation, the operator uses more force in the brake pedal than during power steering operation to attain an equal amount of braking of the vehicle. The valve settings are in a position which would result in greater pressures from the power assist mode than necessary to achieve a desired braking. Should the power steering pump suddenly start, a surge of high pressure fluid would enter into the hydraulic booster resulting in greater braking than intended. This causes sudden stopping or braking and attendant disadvantages including lurching forward of the load and the occupants within the vehicle. An example of such an occurrence occurs when the brakes are applied with the power assist functioning. The engine then stalls or is turned off for some reason. The vehicle is still rolling and is now under the influence of the brakes in a manual mode. Should the operator restart the engine while the vehicle is still in motion and his foot is pushing against the brake pedal, the force which he is using in manual mode will now be used in a power assist mode causing more braking than intended. When this happens in actual practice, the brakes suddenly lock and vehicle deceleration may be excessive.

U.S. Pat. No. 3,625,113 addresses this problem of sudden application of the power assist feature of the hydraulic booster when the brakes are used in the manual mode through the hydraulic piston. The approach used in this patent is the use of an additional seal and sliding element, reference character 42, used within the hydraulic brake booster. A bypass through the piston assembly is created to avoid increased pressure in chamber 38 which is used in power assisted operation. Element 42 used to solve this problem results in the use of another moving piece within the hydraulic booster requiring a significant modification to the other parts of an existing booster. Further, it requires another sealing location. It is desirable to avoid the sudden application of the power assist mode by the hydraulic booster when in manual mode, with minimum modification to existing types of hydraulic booster valves and without the necessity of adding another element and seal.

SUMMARY OF THE INVENTION

The present invention is an improved hydraulic booster which allows transition from a manual braking mode to a power assist braking mode without the control called for in the manual mode immediately applied when the power assist function begins to operate. The present invention is a modification of the gain valve. The modified gain valve has a gain valve chamber with an opening in the chamber wall. There is a path from the power steering pump through the inlet to the hydraulic booster, to the opening of the gain valve and into the gain valve chamber. The gain valve opening communicates with the high pressure side of the gain valve. A push rod which is operatively connected to the brake pedal sealingly slides into the gain valve chamber. A poppet valve is located between the gain valve chamber and the end of the push rod. The poppet valve is closed during normal power assisted operation. The poppet valve opens when the brakes are applied in a manual mode. When the poppet valve is open, a bypass channel communicates from the gain valve chamber to a low pressure outlet at a point downstream from the gain valve chamber. The gain valve does not cause an increase in pressure so that the braking system remains in manual control.

The method of operation is to maintain the hydraulic booster in manual operation although the fluid pressure has been returned. To go from manual to power mode braking, the operator has to take his foot off the brake and the poppet valve is forced to close resulting in normal operation with power assist braking.

It is the object of the present invention to provide an apparatus to prevent the sudden application of the power mode in a hydraulic booster when hydraulic pressure has been lost and suddenly reinstated. It is further an object of the present invention to provide this apparatus with a minimum amount of modification to the basic hydraulic booster presently in use. Finally, it is the general object of the present invention to provide a safe hydraulic booster which compensates for changes from manual to power braking with minimum effect on the vehicle and the occupants.

It is an object of this invention to attain one or more of the objects set forth. These and other objects and advantages of this invention will become apparent to those skilled in the art from the following specification and claims, reference being had to the attached drawing.

BRIEF DESCRIPTION OF THE DRAWING

The attached FIGURE shows a partial sectional view of a hydraulic booster containing the improvement of the present invention.

DESCRIPTION OF THE PREFERRED EMBODIMENTS

The present invention willl be understood by those skilled in the art by reference to the attached FIGURE which is a sectional view of an improved hydraulic booster. It is illustrated with a hydraulic booster which is adapted for use with power braking of a motor vehicle, although it can be used with hydraulic boosters in other applications.

Hydraulic booster 11 comprises a housing or casing 12, a hub piston 13, booster piston 14, a booster control element valve 15 and a gain valve 19 having gain valve piston 22. Housing 12 has a fluid inlet 20 and at least one fluid outlet, including fluid outlet 21. The fluid inlet 20 is in communication with a fluid pump means which, in this case, is a power steering pump. The fluid outlet 21 is in communication with the power steering gear, then through the power steering gear to a low pressure reservoir which feeds to the power steering pump. The housing 12 has a hub bore 24 or other suitable opening in which hub piston 13 is in a sliding relationship. Housing 12 further has a piston bore 25 or other suitable opening in which booster piston 14 is located in a sliding relationship. Preferably, hub bore 24 and piston bore 25 as well as hub piston 13 and booster piston 14 are all located along the same axis within housing 12.

There is a booster control valve means which, in the hydraulic booster used to illustrate the present invention, is a booster control valve element 15 located between hub piston 13 and booster piston 14. The booster control valve 15 slides axially in a space between the hub piston 13 and the booster piston 14. There is a control valve inlet valve 16 and a control valve outlet valve 17. During nonbraking operation a means such as spring 18 biases the booster control valve element 15 so that inlet valve 16 is closed and outlet valve 17 is open.

A means to actuate the hydraulic booster 11, such as a push rod 28, is shown passing through a sealed hub push rod opening 29 into the hub piston 13. The opposite end of the push rod is operatively connected to a brake actuator such as a brake pedal. Pressing the brake pedal causes the push rod to move axially in and releasing the pedal causes the rod to move out of the hydraulic booster 11. The force on the brake pedal transferred through the push rod 28 to the hydraulic booster 11 results in movement of the hub piston 13 and is translated to the booster piston 14 and finally to application of a braking means such as a master cylinder. The braking means is operatively connected to the booster piston 14.

In the hydraulic booster 11, the pumping means such as a power steering pump is connected in communication with fluid inlet 20. Fluid inlet 20 communicates through a radial passage 31, to annular passage 32 which is connected in communication with hub piston passage 34. One end 37 of hub piston passage 34 communicates to gain valve gap chamber 36 and finally to outlet 21. The opposite end 38 of hub piston passage 34 ends at control valve inlet valve 16. Downstream of hub piston passage 34 from control valve inlet valve 16 is an annular passage 42 which communicates from control valve inlet valve 16 to booster piston chamber 43. Within booster piston chamber 43 is the control valve outlet valve 17. There is a second fluid outlet means 44 which passes through booster piston 14 and communicates with the low pressure reservoir of the pumping means.

There are suitable seals between sliding members to prevent fluids from leaking between chambers and passageways. Such sealing means are shown in the hydraulic booster as black circles indicating cross-sectional views of O-rings although other sealing means can be used. These seals include: push rod seal 49 between push rod 28 and hub piston 13 in hub push rod opening 29; gain valve seal 51 between the gain valve 19 and the hub piston 13; hub seals 52, 53 and 54 between the hub piston and hub bore 24 of housing 12; control valve seal 58 between the booster control valve element 15 and the chamber containing it; and booster piston seal 62 between the booster piston 14 and piston bore 25 in housing 12.

When there is no application of the brakes, fluid passes through the hydraulic booster to the power steering gear. Fluid passes from the power steering pump to fluid inlet 20, through radial passage 31, to annular passage 32, into hub piston passage 34, to the one end 37 of hub piston passage 34, through gain valve gap 47, into gain valve gap chamber 36, to hub radial passage 39 to outlet annular passage 40, to outlet radial passage 41 and finally out of fluid outlet 21. A spring means such as spring 46 keeps gain valve piston 22 biased toward the left and gain valve gap 47 open. Hub piston 13 and booster piston 14 are forced leftward to the position shown by a suitable means such as return springs as is known in the art. In the hydraulic booster 11 used to illustrate the present invention, there is a disc stop 48 which cooperates with shoulder 49 of hub piston to prevent the hub piston 13 from sliding out of the hydraulic booster 11 toward the left.

During power assist braking, a braking force applied to the brake pedal causes push rod 28 to move toward the right. Gain valve piston 22 moves toward the right causing gain valve gap 47 to be restricted. This restriction results in a pressure increase from the power steering pumping means through to fluid inlet 20, radial passage 31, annular passage 32, hub piston passage 34 to gain valve gap 47.

The movement of the push rod 28 to the right compresses gain valve chamber spring 46 and forces the hub piston 13 to the right. The hub piston 13 continues to move to the right until outlet valve 17 seats against booster piston 14. Further movement causes the compression of booster control valve spring 18 and the opening of inlet valve 16. High pressure fluid in the hub piston passage 34 is then transferred into booster piston chamber 43. By stepping on the brakes, the operator has transferred his pressure from a small area piston rod 28 to a large area booster piston 14 and additionally has admitted a high pressure fluid to booster piston chamber 43 to force the booster piston 14 toward the right and operatively actuated the braking means such as a master cylinder.

In the present invention, the gain valve 19 has a gain valve chamber 55. One end of the push rod 28 sealingly slides through a push rod opening 57 to the gain valve chamber 55. There is an opening 56 from the gain valve chamber to the high pressure path between the fluid inlet 20 and gain valve gap 47. Preferably, opening 56 opens directly into gain valve gap 47. A poppet valve 59 is between the gain valve chamber 55 and the one end of push rod 28. More particularly, the poppet valve 59 comprises a disc 60 connected to the one end of the push rod 28 passing into the gain valve chamber 55. The diameter of the disc 60 is greater than the diameter of the push rod opening 57. The disc 60 is preferably bevelled and seats on shoulder 61 of push rod opening 57. There is a means to tend to force the poppet valve 59 closed during normal operation. The means shown is poppet spring 65 located in gain valve chamber 55 and pressing between push rod disc 60 and the chamber wall opposite the disc 60. The poppet spring 65 tends to force the poppet valve closed during power assist and nonbraking operation. A bypass passage communicates from gain valve gap 47 to a point on the outlet 21 side of the gain valve gap 47, through the gain valve chamber 55, when poppet valve 59 opens. Preferably, a bypass channel 66 is connected from a passage 67 in hub push rod opening 29, which communicates with gain valve chamber 55, to the low pressure passage from gain valve gap chamber 36 to outlet 21, preferably at radial passage 39. Alternately, the bypass channel 66 can be connected anywhere from the low pressure or outlet side of the poppet valve 59, to outlet 21 such as in outlet radial passage 41 or outlet annular passage 40. The bypass channel 66 is shown as radial passage 68, from passage 67 in push rod opening 29, connected to passage 69 which is connected to hub radial passage 39.

When the brake is not applied, the push rod is forced to the left by poppet spring 65 and any pressure from fluid within gain valve chamber 55 that is transferred from the pumping means through fluid inlet 20 to radial passage 31, to annular passage 32, to hub piston passage 34 to gain valve gap chamber 36, through opening 56 and finally to chamber 55. Therefore, when the brake is not applied, the poppet valve 59 is closed. During normal operation when the brake is applied, there is a restriction at gain valve gap 47 causing an increase of pressure in gain valve chamber 55. This plus proper sizing of the poppet spring 65 results in sufficient forces against the disc 60 of the push rod to maintain the poppet valve 59 in a closed position even as the brake is applied.

In the case where there is no fluid under pressure pumped into fluid inlet 20 due to an engine stall or some other failure in the pumping system, the braking system is in a manual mode. When the brakes are applied, the force from the brake pedal is transferred through the hydraulic booster 11 to the booster piston 14 and finally to the braking means such as a master cylinder without the aid of high pressure fluid being forced against the booster piston 14. In this situation when the brake is applied, the gain valve gap 47 in the gain valve 19 is restricted but there is no increase in pressure at gain valve gap 47 and in gain valve chamber 55. The force from the push rod 28 acts only against the spring 65 and any nominal pressure within the fluid path. The poppet valve 59 then opens, pushing poppet spring 65 against the gain valve which in turn manually forces the hub piston 13 and then pushes the piston 14 to apply force to the master cylinder of the braking system. The motor vehicle can continue in a stalled condition. If the pump once again starts pumping fluid and the present invention is not used, a sudden surge of pressure results because the manual pressure causes gain valve gap 47 to be a minimum. A maximum amount of pressure is suddenly applied to hub piston passage 34, through inlet valve 16, which is in an open condition with the manual application of the brake. This causes a greater application of the brake without any more movement of the push rod from the brake pedal. Therefore, there is an unexpected locking of the brakes and the attendant action such as the lurching forward of the vehicle load and the passengers.

With the present invention, when manual brakes are applied and there is no increase in pressure from the pumping means, poppet valve 59 opens as noted. Although gap 47 is restricted due to the manual pressing of the brake pedal, there is an alternate path, bypass channel 66, to relieve the pressure and prevent a pressure buildup in booster piston chamber 43. Should the power steering pump start while there is manual braking, the fluid pumps through inlet 20 to radial passage 31 to annular passage 32, to hub piston passage 34, to gap valve chamber 36 through opening 56 into gain valve chamber 55, through open poppet valve 59 into bypass channel 66 and finally out of fluid outlet 21. There is no sudden buildup of pressure in hub piston passage 34 and the attendant effects on booster piston 14 causing a sudden locking of the brakes. In order to regain the power assist function of the hydraulic booster 11, when the power steering pump is operating, all the operator has to do is complete his sequence of the manual mode of operation of the brake and remove his foot from the brake. Poppet spring 65 causes poppet valve 59 to close and once again the hydraulic booster is ready for normal operation.

The present invention provides, through a poppet valve linkage, a means to prevent the sudden application of power assist braking when manual braking is being operated. This is accomplished by a fluid bypass passage which is opened during manual braking. As soon as the vehicle driver releases the brake pedal after manual mode braking, the poppet valve closes and the hydraulic booster returns to normal position for power assist braking.

Modification, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein but rather should be limited by the advance of which the invention has promoted the art.

What is claimed is:
1. A hydraulic booster which comprises:
a housing having an inlet and an outlet;
a hub piston reciprocable in a hub bore in the housing and having a hub piston passage which communicates with the inlet and outlet;

a booster piston reciprocable in a booster bore in the housing and having a booster piston chamber which is between the hub piston and the booster piston and has
a booster piston chamber outlet;
a control valve element coacting between the hub piston and the booster piston and having (i) an inlet valve to open and close an inlet between the hub piston passage and the booster piston chamber and (ii) an outlet valve to open and close the booster piston chamber outlet;
a gain valve piston reciprocable within the hub piston, the gain valve piston being located to restrict a gap in the hub piston passage to the outlet, there being a gain valve chamber in the gain valve piston and an opening in the gain valve chamber;
a push rod having one end slidably passing through a push rod opening in the hub piston and into the gain valve chamber through the opening therein;
a poppet valve disposed in the gain valve chamber on said end of the push rod to open and close the opening in the gain valve chamber;
means to bias the poppet valve in closed relation with the opening in the gain valve chamber; and
a bypass chamber in the hub piston communicating with the opening in the gain valve chamber and the hub piston passage between the outlet of the housing and the gap in the hub piston passage.

2. The hyraulic booster as recited in claim 1 wherein the poppet valve further comprises:
a disc connected to the end of the push rod passing into the gain valve chamber, the disc having a diameter greater than the diameter of the push rod opening and seats against push rod opening.

3. The hydraulic booster as recited in claim 2 wherein the means to bias the poppet valve closed is a spring between the disc and a gain valve chamber wall.

4. A hydraulic booster, comprising:
(a) a housing having a first bore in communication and coaxial alignment with a second bore, and a fluid inlet and fluid outlet in spaced communication with the first bore;
(b) a hub piston reciprocable in the first bore and having one end thereof extending into the second bore, the piston having in the one end a chamber which communicates with the second bore and has an annular valve seat surrounding an opening therein in spaced relation from the one end, the piston having a fluid passageway that connects the fluid inlet, fluid outlet and opening in the chamber;
(c) a booster piston reciprocable in the second bore by the hub piston, as the hub piston reciprocates in the first bore, the booster piston having a fluid outlet which is in communication with the chamber in the hub piston;
(d) a booster control valve element extending into the chamber and reciprocable axially of the hub piston, the element carrying (i) a first valve for sealing the fluid outlet of the booster piston from the chamber when there is sufficient relative movement of the hub and booster pistons towards each other, and (ii) an annular valve for engaging the annular seat and sealing the opening in the chamber, prior to the first valve sealing of the fluid outlet of the booster piston;
(e) means for biasing the valve element in the direction of the booster piston to maintain the annular valve against the valve seat;
(f) a push rod and gain valve piston coacting with the hub piston to move the hub piston in the direction of the booster piston, the gain valve piston capable of closing the fluid passageway connecting the fluid inlet and fluid outlet of the housing; and
(g) means for relieving fluid pressure in the fluid passageway connecting the fluid inlet and fluid outlet caused when the gain valve piston moves to close the fluid passageway.

5. The booster of claim 4, wherein the fluid pressure relieving means (g) includes:
(h) a chamber within the gain valve piston and having an opening therein in farthest spaced relation from the booster piston;
(i) a disc attached to the push rod and disposed in the chamber of the gain valve piston and designed to seal the opening in the chamber of the gain valve piston;
(j) means for biasing the disc in sealing relation with the opening in the chamber of the gain valve piston; and
(k) a fluid conduit connecting the opening in the chamber of the gain valve piston with a portion of the fluid passageway adjacent the fluid outlet.

6. The booster of claim 5, which includes:
(l) means for biasing the gain valve piston in a direction away from the booster piston;
(m) a second opening in the chamber of the gain valve piston in opposed relation to the other opening therein, the second opening being in communication with the fluid passageway; and
(n) means for biasing the hub and booster pistons apart, to keep the first valve free of the fluid outlet of the booster piston.

* * * * *